Figure 1:
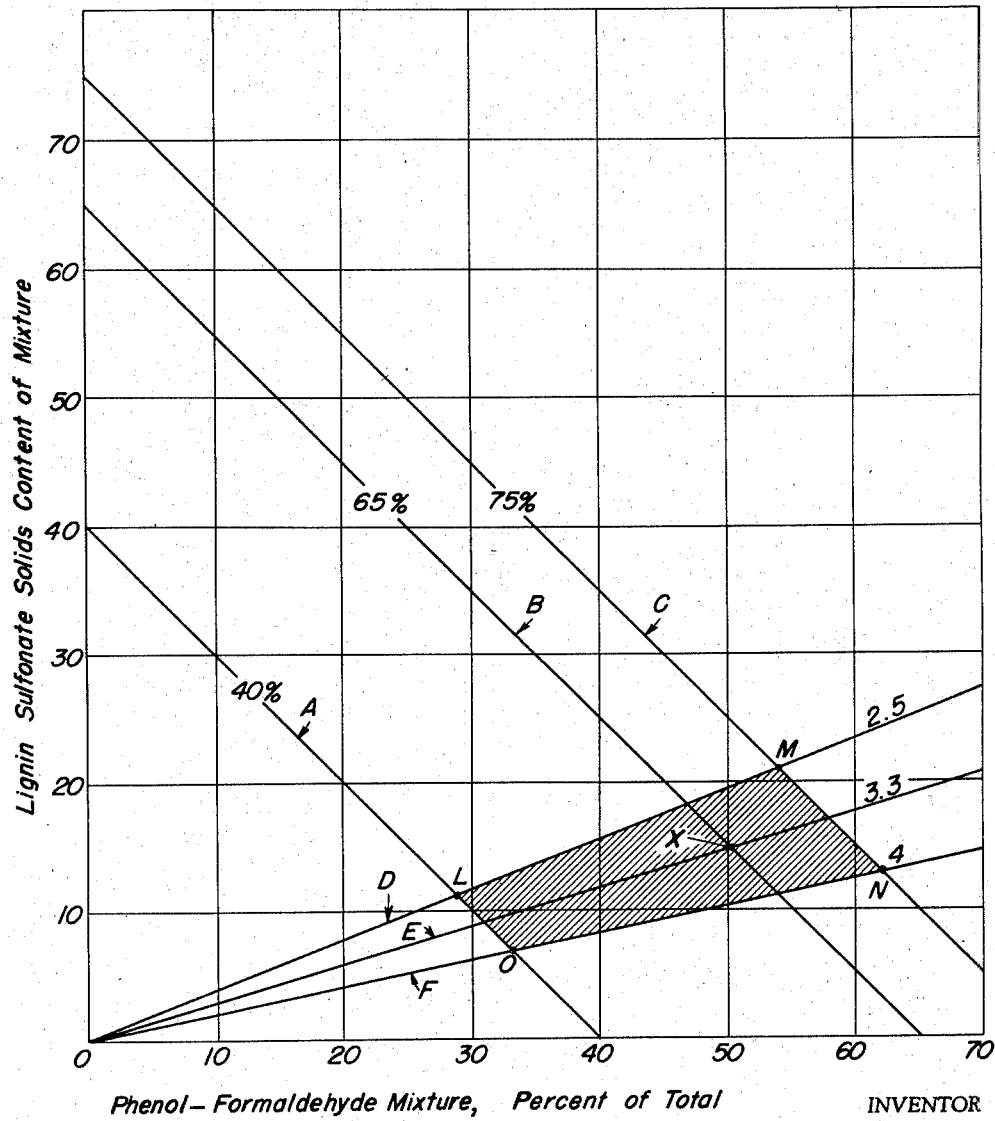

INVENTOR
JAMES L. BARREN

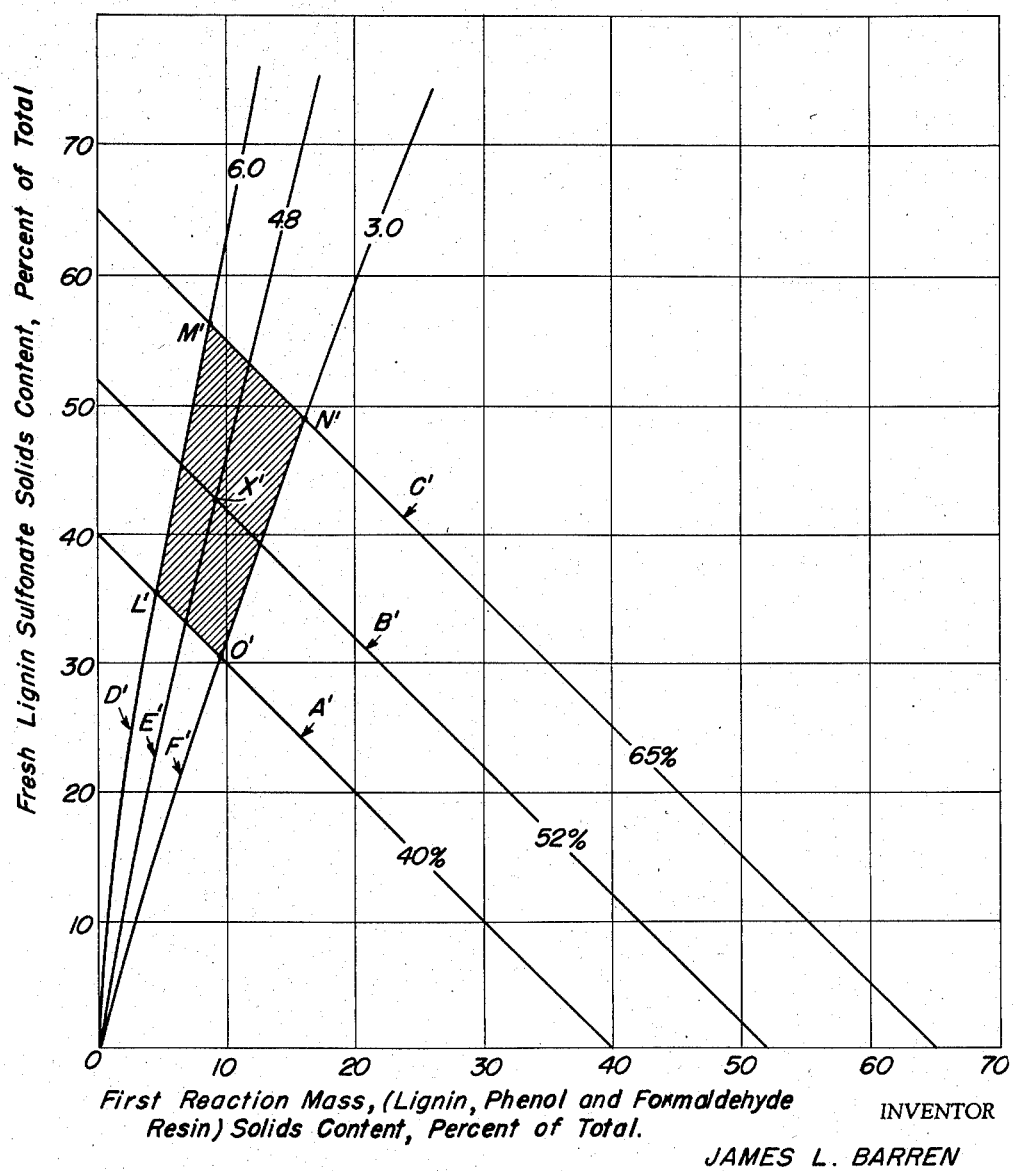

United States Patent Office 2,891,020
Patented June 16, 1959

2,891,020

LIGNIN SULFONATE-PHENOL-FORMALDEHYDE TANNING EXTRACT AND PROCESS OF MAKING SAME

James L. Barren, Port Allegany, Pa., assignor of one-third to Emporium Trust Company, Emporium, Pa., and one-third to Horace E. Allen, Longmeadow, Mass., both as trustees Application January 24, 1957, Serial No. 636,064

6 Claims. (Cl. 260—17.5)

This invention relates to tanning materials of vegetable origin as distinguished from materials of the chrome or mineral type. More particularly, the invention is directed to a tanning agent comprising a phenol formaldehyde lignin sulfonate condensation product and the method for making the same. To be somewhat more specific, I have found that a better leather can be obtained by using, as a tanning agent, a product that has been processed by a two-stage process. Such two-stage process involves a condensation reaction of lignin sulfonate, phenol and formaldehyde.

Lignin sulfonates have been widely used in the leather industry for tanning and various modifications of such material by resins, such as phenol formaldehyde resins, have been proposed. Leather made with such tanning agents has been found to be more durable and more generally satisfactory than leather made from the straight tannins. As is known by those skilled in the art, prior tanning substances of this nature have been made by reacting together in one vessel all of the necessary ingredients. As indicated, the instant improvement in this procedure, resulting in an improved product, resides in a recognition of the superior results achieved by a two-stage process.

Although the exact chemical composition of lignin, lignin sulfonate or lignin sulfonate resin has generally been unknown, it is recognized that any of the various kinds of lignin found in wood can be sulfonated and suitably reacted to obtain tanning extracts. In the instant case, a coniferous wood is preferred, particularly hemlock. The latter contains a high percentage of tannin and such an extract is generally conducive to the obtaining of a light colored and satisfactory leather.

There are several known commercial methods, particularly having reference to by-product procedures of the paper making industry, of dissolving out the lignin. A preferred procedure involves cooking the cellulose starting material under pressure and in a solution of sulfurous acid and calcium, sodium or ammonium bisulfite. During such procedures, the sulfur groups of the named components attach themselves to the lignin to form a lignin sulfonate which is soluble in water. In the referred to industry, this is the by-product commonly referred to as lignin sulfonate.

In view of the almost insurmountable difficulty of qualitatively determining, chemically speaking, the nature of this product, various factors such as the size of the molecule, its chemistry, solubility, color, etc., must depend entirely on the history of the reaction. Hence, control over the reaction by way of temperature and time conditions is the fundamental basis for an understanding of the chemical groups present.

Other pressure cooking procedures are also known. These involve cooking with sodium hydroxide, a mixture of that material and sodium sulfide, or cooking with a mixture of sodium bisulfite and sodium sulfite. These other procedures, just named, are, however, not ordinarily employed to obtain tanning extracts which are suitable for use in the leather industry.

Thus, to somewhat summarize, it has long been known that the lignin sulfonate contained in waste sulfite liquor in the process of making paper pulp from such coniferous woods as hemlock could be converted into a tanning extract by suitable purification processes. Such extracts exhibit a considerable and desirable tannin content and, hence, are utilized as tanning reagents. The instant improvement lies in the recognition of the fact that in making the extract by a two-stage, two-reaction mass process, a superior and better colored leather product is obtained as a result of the ultimate tanning procedure.

This two-stage procedure, to be described in more particular hereinafter, broadly consists in first reacting a relatively small amount of lignin sulfonate solids with a larger quantity of phenol and formaldehyde in an acidic aqueous medium. The first reaction mass may be described as a dispersion of the named solids in water. This mass is heated, at a predetermined elevated temperature, and agitated, for a period of time sufficient to complete the desired reaction. Both time and temperature, as will be seen, are critical controls over the resultant product and each factor must be carefully regulated. The resultant reaction produces a phenol formaldehyde resin modified by the inclusion of lignin sulfonate. This product of the first reaction is then added to fresh, unreacted lignin sulfonate solids in an aqueous medium. The latter provide the second reaction mass, which is reacted under conditions of considerable agitation to form the ultimate extract.

It has been found that the first reaction product is effectively dispersed in the balance of the lignin sulfonate material. The final reaction, brought about after a suitable period of agitation, is followed by a spray or other conventional drying procedure to produce a powder extract capable of improved tanning.

From the foregoing discussion, it should be apparent that a primary object of my invention is the provision of a two-stage process involving a condensation reaction between a phenol-formaldehyde mixture and the referred to lignin sulfonate which results in the production of a superior and more effective tanning reagent or extract.

A further objective of the invention is the provision of a process which, generally designed as an improvement over known procedures, may be carried out by recognition of relatively simple and understandable factors, such as time and temperature control, and realization that the two-step procedure advantageously produces an extract of proper tanning quality.

Another object of the invention is the production of a superior tanning extract by means of a procedure which is most economical to practice and is without the manipulative complexities which often enter into processes heretofore practiced in the production of synthetic or natural tanning agents.

Further objects and advantages of the invention will be apparent from the more particular description which follows, and having reference to the accompanying drawings, wherein:

Figure 1 is a graph indicating the percentage of the constituents and the range of ratios thereof, of the first reaction mass, and Figure 2 is a graph, similar to Figure 1, representing the same range of values and ratios but having reference to the second reaction mass.

With more particular reference to these figures, it is seen that Figure 1 indicates the areas of satisfactory performance of the process of this invention at varying percentage ranges and ratios of preferable reaction mass mixtures. The ordinate line of the figure indicates the percentage of lignin solids content of the mixture expressed on the basis of the total weight of the entire reaction mass. The figures along the abscissa represent the percentage of phenol and formaldehyde mixture, also expressed on the basis of the total weight of the reaction mass. As hereinbefore stated, the representations found in the graph of Figure 1 are related to the first of the two reactions.

Phenol and formaldehyde are present in a ratio of the following order: about 42 parts of phenol to about 7.5 parts of formaldehyde. This ratio between the components of the phenol-formaldehyde mixture will be satisfactory for proper performance although the percentage of lignin solids and the ratios of resin to lignin may vary considerably in the first as well as in the second reaction mass, and as set forth herein. In other words, the ratio of phenol to formaldehyde in the first reaction mass will be about 6 to 1 and, expressed on the basis of parts by weight, may vary within rather narrow limitations, as follows: the phenol component may be adjusted between 40 to 44 parts and the formaldehyde component adjusted between 6 to 8.5 parts. However, in the preferred operation of the process, the first stated specific ratio of 42 parts of phenol to about 7.5 parts of formaldehyde is most desirable.

At any rate, the diagonal lines A, B and C of Figure 1 represent, respectively, 40%, 65% and 75% of the total phenol-formaldehyde mixture and lignin sulfonate solids content of this mass and, in addition, represent, respectively, the lower, preferred, and upper percentage amounts of such solids.

There are further straight lines originating from the zero point across to the right of the graph and terminating in several designated ratios involving the ratio of the phenol-formaldehyde mixture to lignin solids present in this mass. These lines, D, E and F, indicate ratios of the phenol-formaldehyde mixture to lignin solids as 2.5, 3.3 and 4. Here, again, these are, respectively, the lower, preferred and upper ratios of such solids. The four points of the graph, L, M, N and O, thus indicate the boundaries of proper and desired performance, for it is within such boundaries that the amount of the phenol-formaldehyde mixture and the amount of lignin solids are represented in proper percentage amounts and in proper ratio to each other to obtain the improved extract achieved by this invention.

Thus, still referring to the graph of Figure 1, the range of the percentage amounts of the components of this first reaction, and the limitations as to the ratio of one component to the other, are readily determinable. The point L indicates the lower limitation upon the amount of phenol formaldehyde mixture solids as being about 28%. The point N represents the upper limitation of this component, expressed as a percentage of total weight of about 62%. Insofar as the lignin sulfonate solids are concerned, it will be appreciated, referring to this figure, that the lower limit is represented at point O, approximating 7%, whereas the upper limit of this range, represented at M, approximates 21%. Having in mind these limitations upon the solid components and considering also the preferred ratios of phenol-formaldehyde mixture to lignin solids which are expressed in Figure 1, the total of the mixture and solids of the first reaction mass are also determinable and designated on this figure. As stated above, such total will vary between 40% to 75% of the total weight of the first reaction mass.

The cross hatched area of the figure represents the metes and bounds of this invention, having reference to the percentage amounts and respective ratios of the components of the first reaction mass.

Referring now to Figure 2, it is found that the arrangement of this graph is similar to that shown in Figure 1. Here, however, we are dealing with the second reaction mass, the lines A', B' and C' referring to the total percentage of solids found in such second reaction mass. In this instance, the total solids, expressed as a percentage of the total weight of the second reaction mass, are bounded by line A', representing a lower limit of 40%, and by line C', representing a 65% upper limit. The line B', running through the point X, is representative of the preferred example of this invention wherein the second reaction mass contains a total solids content of 52%, this total solids content representing a ratio of the resinous product of the first reaction mass to fresh lignin solids of 4.8 as designated by line E'.

Again, the lower and upper limitations upon the content of fresh lignin solids added in this reaction and the product obtained from the first reaction, are readily determinable. As to the first, the point O' represents the lower limitation upon addition of fresh lignin solids; this is found to be approximately 30%. The lignin solids are not added to an amount exceeding about 56%, as indicated by the point M'.

Percentage amounts of the resinous reaction products obtained from the first reaction mass may vary from between about 4% to about 16%, these two points of limitation being represented by points L' and N', respectively.

It is, of course, to be understood, as intimated in the foregoing, that the ratio designations 6.0, 4.8 and 3.0, placed upon the graph lines D', E' and F', respectively, illustrate the preferred workable ratios between fresh lignin solids and the resinous product obtained from the first reaction mass. In other words, in no event should the ratio of fresh lignin solids to the solids obtained from the first reaction exceed 6 to 1 and in no event should this ratio be less than 3 to 1. Such ratios are kept consistent with the amount of total solids in the entire reaction mass represented, as stated, by graph lines A', B' and C', respectively.

As in the case of Figure 1, the metes and bounds of the invention, and having reference to the second reaction, are represented in Figure 2 by the cross hatched area appearing within the space circumscribed by points L', M', N' and O'. For reasons stated herein, lowering or exceeding the limitations placed upon the second reaction and expressed in Figure 2 will result in a product which is not practically suitable for use as a tanning extract.

In both Figures 1 and 2, the preferred embodiment or example of the invention is to be found at X and X', respectively. Such graphic expression of the preferred process is seen to fall within or approximate the middle of the ranges which have been expressed, i.e., those ranges having to do, firstly, with the percentage of lignin solids and the phenol-formaldehyde mixture in the first reaction mass; secondly, with the percentage of fresh lignin solids and resinous product of the first reaction mass present in the second reaction mass; and thirdly, with the percentages by weight of the total of such solids present in both reactions.

Reference will now be made to a specific example of the invention, heretofore identified with reference to Figures 1 and 2. In this preferred form of practicing the invention the percentages expressed are percentages by weight of the mass. The following process conditions have been found to be particularly suitable. The first reaction mass, containing approximately 15% of lignin sulfonate solids, about 42% of phenol and about 7.5% of formaldehyde, and about 35.5 parts of water is prepared. 0.67% by weight of sulfuric acid is added as the catalytic agent, promoting completion of the first reaction. This mass is heated to a temperature of about 165° F. and agitated for a period of approximately four hours. During this period of time, it is essential that the referred to temperature not exceed about 175° F.

The product of the first reaction obtained under the conditions enumerated above is then utilized in the preparation of the second reaction mass. Here, 14% of the total reaction product of the first reaction is admixed with about 43% water and about 43% additional lignin sulfonate solids. This second composition is violently agitated for a period of approximately one hour, then the second reaction mass is dried, preferably by spray drying, to produce the tanning powder. The temperature of the second reaction mass should again be maintained at about 165° F. and not permitted to exceed the maximum of 175° F.

The example just referred to, as suggested above, can be identified by reference to the letter X in both Figures 1 and 2. Viewing the graph of Figure 1, it thus appears that at the preferred point of operation, there is 50% of the phenol-formaldehyde mixture and 15% lignin solids, giving a ratio of 3.3 of the phenol-formaldehyde mixture to lignin solids, the phenol-formaldehyde and lignin sulfonate mass having a total solids content of 65%. Similarly, the preferred condition of the second reaction mass is indicated at the point X in Figure 2. Here it is found that there are present about 43% fresh lignin solids and a total of 9% of the first reaction mass solids. This value of 9% is derived from the value of 14% of the weight of the total mass of the first reaction as given in the specific example, recited above. Further explanatory of the 9% value, it may be observed that since the second reaction mass consists of both solids and water and since the composition of the first mass is known, it may then be computed that the solids in the first reaction mass that are used in the second reaction are 9% of that total.

By reference to the two figures, further evaluation of the boundaries of the invention involved in these two reactions may be obtained. For example, in Figure 1, it is seen that the minimum ratio of phenol-formaldehyde to lignin solids is 2.5. This has been determined as the lower limit of this ratio; at values lower than this, it has been found that there is not enough resin present to permit proper completion of the first reaction. On the other hand, line F of Figure 1 illustrates the maximum ratio of the stated mixture to lignin solids. Here, it has been determined that if the mixture to lignin ratio exceeds 4, then too much phenol-formaldehyde mixture is present to properly carry out the reaction. In the latter instance, where the ratio exceeds 4, the reaction will proceed to the formation of a hard, indispersible varnish. Hence, lines D and F illustrate the limits of these specified ratios.

The central line emanating from the zero point passes through the preferred example, pin pointed at X and here it has been found that the most desirable operation for proper completion of the first reaction is one wherein the ratio of resin to lignin is 3.3. This actually represents approximately the midpoint between the two lower and upper ratio limitations.

Other limitations, representing the orbit of this invention, are also clearly represented in Figure 1, again having reference to the first reaction mass. Primarily these have to do with the total percentage of solids in that first reaction mass. It has been determined that if such total solids exceed about 75%, the liquor of the mass is too thick or viscous to be agitated uniformly; hence, the process with respect to this first reaction will not satisfactorily operate if there is an excess of about 75% total solids. As stated, this upper limitation of about 75% is diagrammatically indicated in Figure 1 by the graph line C. Upon the opposite side, there is a lower limitation which also should be observed. This lower limitation is about 40% total solids in the first reaction and, in Figure 1, is represented by the graph line A. It has been found that if the total solids of the first reaction mass are below this 40% limitation, the reaction will proceed, but unsatisfactorily so, for at points below about 40%, too much water is present to bring about the necessary and intimate association of materials and reagents to satisfactorily complete the desired reaction. It is seen, therefore, that the ranges of both the phenol-formaldehyde mixture to lignin ratios and the percentage amounts of total solids contemplated by this invention are represented, respectively, by the boundary lines L—O and M—N on the one hand, and the boundary lines L—M and O—N, on the other. Again, the comment is apparent that, with reference to this first reaction, the graph line B, passing through the preferred operation, pin pointed at X, represents a total solid content of the first reaction mass of about 65%.

A similar breakdown of Figure 2 can be made by considering the various limitations of the invention exhibited by corresponding graph lines found in this figure. Here, the graph lines emanating from the zero point indicate constant ratios, whereas in like manner as with respect to Figure 1, the intersecting graph lines represent percentage of total solids of the second reaction mass. One qualification with respect to the second reaction and with respect to Figure 2 is necessary—in this instance, the ratios of lignin to resin are expressed as parts of fresh lignin solids to parts of first reaction mass solids. It is seen that the boundary ratios range from 6.0 resin to lignin down to 3.0 resin to lignin. It has been found that if the upper limitation of 6.0, just expressed, is exceeded, then proper tanning qualities will not be found in the resulting spray-dried powder; whereas, if the resin-lignin ratio is less than 3.0, there will be too much of a resiny character to the powder to make it satisfactory for leather tanning purposes.

Similarly, the two boundaries of percentage of solids, found in graph lines A′ and C′ are about 40% and about 65%, respectively. It has been found that if the total solids of this second reaction mass are less than about 40%, the process becomes too slow, uneconomical and, therefore, impractical. In addition, to reduce this amount to less than about 40% results in too dilute a material with consequent difficulties encountered in the subsequent spray-drying or other type of drying of the ultimate extract. If the total solids of this second reaction mass exceed about 65%, then it is a practical impossibility to obtain formation of a good powder extract by spray drying or other drying techniques.

In summary of Figure 2, it is to be understood that L′—O′ and M′—N′ are graph lines indicating limitations upon the total of fresh lignin solids, whereas boundary lines L′—M′ and O′—N′ represent limitations upon the resin to lignin ratio that must be observed for proper performance of this process.

It is to be understood that the expressed limitations are approximate numeral designations of the desired ranges; such numeral designations should be qualified by the term "about"; for example, taking the limitation on the resin to lignin ratios, such limitation should be expressed as follows: from about 6.0 to about 3.0. In other words, the normal interpretation of the term "about," permitting a factual deviation, should be employed in adjudging the fair limitations of the involved ranges with respect to these two described reactions.

Again, with respect to Figure 2 and having reference to the second reaction, it is seen that approximately midway between the expressed ratios and designated percentage total of fresh lignin solids, is found the preferred operation, described in more detail above. Pin pointed at X′ in Figure 2, the preferred constituents of the second reaction mass are found to be about 52% of total solids indicated by the graph line B′, whereas the preferred ratio of 4.8 resin to lignin is indicated by the graph line E′.

In carrying out each of the described reactions, several controlling factors should be observed. The first, having to do with the temperature range, has already been referred to. It has been found that the temperature of each reaction mass must be limited to below about 175° F. About 165° F. is the preferred temperature. At values lower than this, the reaction takes place too slowly to be of any practical utility for the purpose of this invention and for practical application in the tanning industry.

The second factor, and having reference to the first reaction mass only, involves the use of a catalyst. It has been found that sulfuric acid is desirable as a catalyst to effect efficient completion of that reaction.

As indicated above, the preferred amount of catalyst is 0.67% by weight of concentrated sulfuric acid, having reference to such acid of at least 93% concentration. The amount of such catalyst, however, may be varied somewhat and the process is operative and useful where the catalytic agent varies in an amount of from about 0.35% to about 2%, such range values similarly having reference to the percentage by weight of such concentrated sulfuric acid, the percentage being a percentage weight of the total liquid mass.

Other catalytic reagents, such as sulfamic acid or oxalic acid, may be substituted for sulfuric acid and, in such instances, the preferred amount used, 0.67% by weight, and the range which has been given above, are applicable. It has been observed that certain acids do not possess any catalytic effect in this reaction and, accordingly, are not useful in the process. As examples may be mentioned lactic acid, hydroxy acidic acid and formic acid, none of which are sufficiently ionized to catalyze the reaction.

The percentage of the preferred catalytic reagents, as set forth above, may also be expressed, using sulfuric acid as an example, as a ratio between sulfuric acid solids or concentrated sulfuric acid, and lignin sulfonate solids. Thus, in the preferred example set forth above, one part of sulfuric acid is used to 22.5 parts of lignin sulfonate in the first reaction. If the lower limit of 0.35% sulfuric acid (in the range set forth above) is used, then such percentage is equivalent to an acid to lignin sulfonate ratio of 1 to 42. If the upper limit of 2% sulfuric acid catalyst is employed, the resultant ratio is a ratio of one part acid to seven parts lignin sulfonate.

The above refers to percentage components of the catalytic reagent or determinations which express standard values to effectuate completion of the reaction of this invention in a desirable manner, again taking into consideration the time and temperature factors outlined in the foregoing.

A final factor is also important and must be observed in carrying out the process of this invention. As intimated above, it is necessary that the ratio of lignin sulfonate to phenol formaldehyde be carefully controlled in the first reaction mass. If too little lignin sulfonate solid is added, the phenol formaldehyde reaction will present an exothermic reaction, resulting in the formation of a hard varnish that can not be dispersed satisfactorily. On the other hand, if too much lignin sulfonate solid is present, the phenol and formaldehyde are so diluted as to prevent proper resin formation.

The spray drying spoken of as the last step in this process following completion of the second reaction comprises largely conventional apparatus. In this particular procedure, however, it is preferable that the dispersion type be employed. Such apparatus as is here made reference to is typified by the dispersion type dryers produced commercially by the Western Precipitation Corporation or by Bowen, Engineering, Inc. Specific methods of spray drying are not generally employed in the tanning industry, it only being necessary to utilize a means that will convert the extract to powder form efficiently and in a reasonable amount of time.

Since ranges and boundary limitations of the invention have been given in the above description, it is obvious that there are many alternate embodiments thereof. However, such limitations are to be interpreted under the ordinary rules of construction so as not to unduly limit the scope of the invention. Hence, it is to be understood that the limitations upon this invention are only those clearly set forth in the claims appended hereto.

I claim:

1. In a process for making a tanning extract, preparing a first reaction mass containing from about 7% to about 21% by weight of lignin sulfonate solids and a phenol-formaldehyde mixture consisting of from about 40 parts to about 44 parts of phenol, and from about 6 parts to about 8.5 parts of formaldehyde, all in an aqueous medium, said lignin sulfonate solids and said phenol-formaldehyde mixture comprising from 40% to 75% of the total weight of said mass, reacting this mass at a temperature of from about 165° F. to about 175° F. under conditions of violent agitation, preparing a second reaction mass comprising an aqueous solution consisting of from about 30% to about 66% water and from about 30% to about 56% of unreacted lignin sulfonate solids, adding from about 4% to about 16% of the product of said first reaction mass, and reacting said second reaction under conditions of agitation and at temperatures of from about 165° F. to about 175° F.

2. The composition of matter resulting from the process defined in claim 1.

3. In a process for making a tanning extract, preparing a first reaction mass containing from about 7% to about 21% by weight of lignin sulfonate solids, a phenol-formaldehyde mixture of about 42 parts phenol and about 7.5 parts formaldehyde, and from about 0.35% to about 2% by weight of sulfuric acid, said lignin sulfonate solids and said phenol-formaldehyde mixture comprising from about 40% to about 75% of said mass, reacting this mass at a temperature of about 165° F. under conditions of violent agitation, preparing a second reaction mass comprising an aqueous solution consisting of approximately 43% water, about 43% unreacted lignin sulfonate solids and about 14% of the product of the first reaction mass, permitting said second reaction to continue for a period of approximately an hour, at temperatures of from about 165° F. to about 175° F.

4. The composition of matter resulting from the process of claim 3.

5. In a process for making a tanning extract, preparing a first reaction mass containing from about 7% to about 21% by weight of lignin sulfonate solids, a phenol-formaldehyde mixture of about 42 parts phenol and about 7.5 parts formaldehyde and from about 0.35% to about 2% by weight of sulfuric acid, said lignin sulfonate solids and said phenol-formaldehyde mixture comprising from about 40% to about 75% of said mass, reacting this mass at a temperature of about 165° F. under conditions of violent agitation, preparing a second reaction mass comprising an aqueous solution consisting of approximately 43% of unreacted lignin sulfonate solids, and about 14% of said first reaction mass, and reacting said second reaction mass at a temperature of about 165° F. under conditions of agitation.

6. A process for making a tanning agent which comprises preparing a first reaction mass containing from about 7% to about 21% of lignin sulfonate solids and a phenol-formaldehyde mixture comprising about 42 parts phenol and about 7.5 parts formaldehyde, and from about 0.35% to about 2% of a catalyst selected from the group consisting of sulfuric, oxalic and sulfamic acids, said lignin sulfonate solids and said phenol-formaldehyde mixture comprising from about 40% to about 75% by weight of said mixture, reacting this mass at a temperature of from about 165° F. to about 175° F. for a period of approximately four hours under conditions of violent agitation, preparing a second reaction mass comprising about 43% water, about 43% unreacted lignin sulfonate solids and about 9% of the reacted solids of the first reaction mass, permitting said second reaction to continue at a temperature of from about 165° F. to about 175° F. for a period of approximately an hour, and spray drying the resulting mass of said second reaction to provide a tanning powder.

References Cited in the file of this patent

UNITED STATES PATENTS 2,099,717    Alles  ----------------  Nov. 23, 1937